Jan. 8, 1935.   R. S. SCOTT   1,987,081
PHOTOGRAPHIC FILM LOOP FILING CARD
Filed Sept. 18, 1933   2 Sheets-Sheet 1
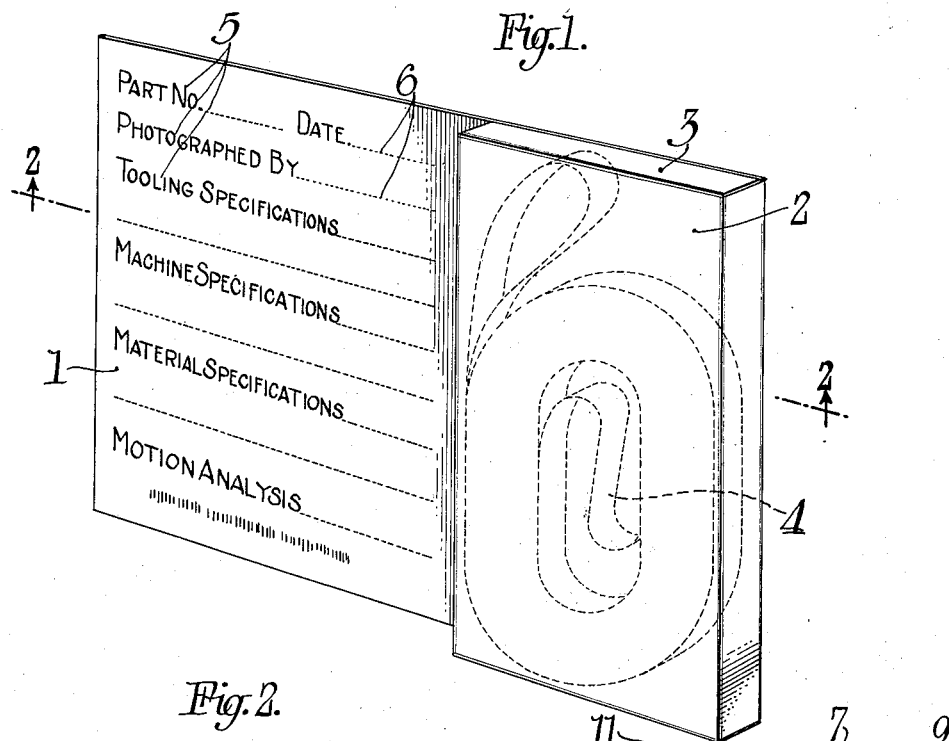
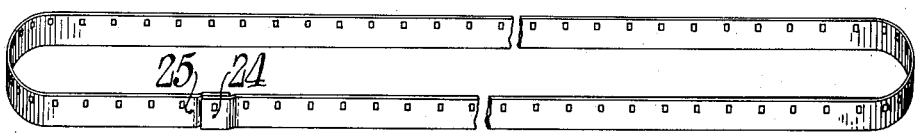
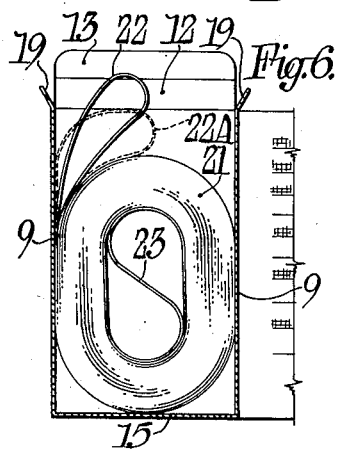
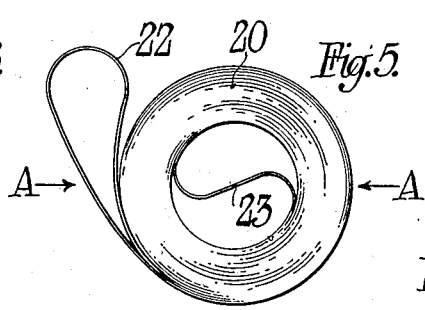
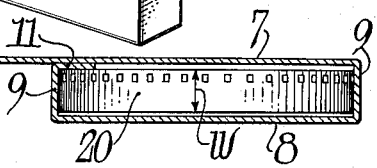

Jan. 8, 1935.  R. S. SCOTT  1,987,081
PHOTOGRAPHIC FILM LOOP FILING CARD
Filed Sept. 18, 1933  2 Sheets-Sheet 2
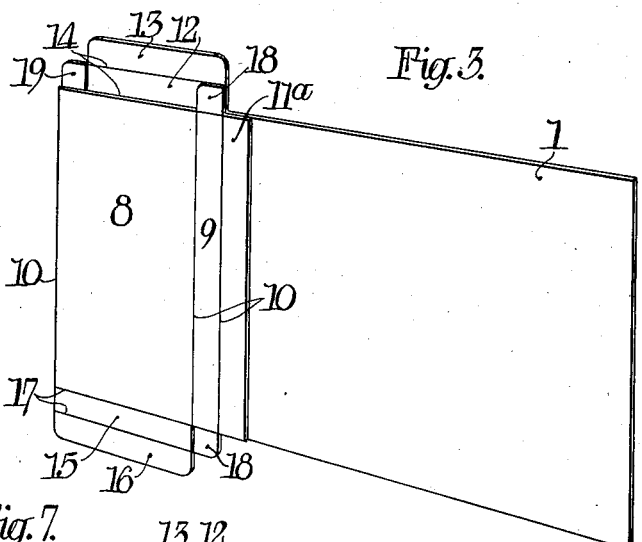
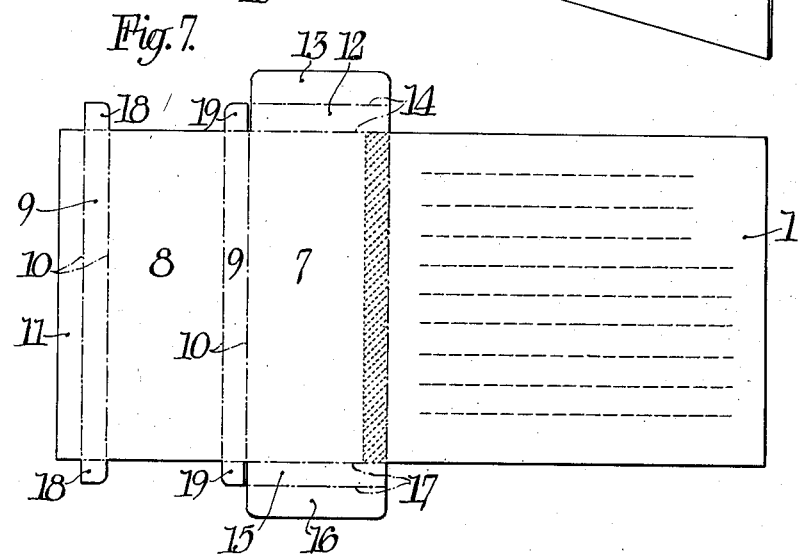
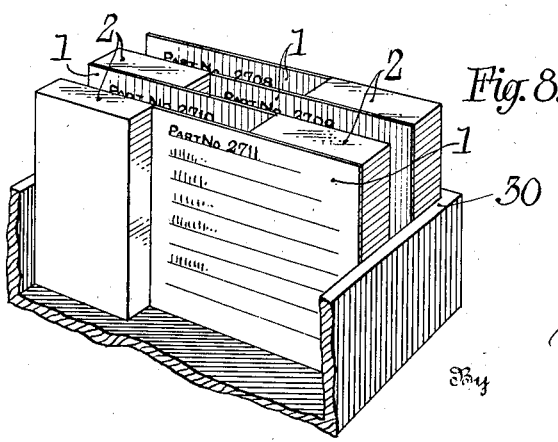

Patented Jan. 8, 1935

1,987,081

UNITED STATES PATENT OFFICE 1,987,081

PHOTOGRAPHIC FILM LOOP FILING CARD

Ronald S. Scott, Rochester, N. Y., assignor to Eastman Kodak Company, Rochester, N. Y., a corporation of New York Application September 18, 1933, Serial No. 690,022

1 Claim. (Cl. 206—46)

This invention relates to photography and more particularly to a means for filing loops of photographic film for ready reference. One object of my invention is to provide a photographic film loop file which will protect the film from damage and which will preserve the surface of the film from abrasion. Another object of my invention is to provide an inexpensive film holder in the form of a boxlike structure having a card or tab on which any desirable data can be placed. Another object of my invention is to provide a film holder in the form of an elongated box having a removable flap which may normally enclose one end of the film loop and which will permit one end of the film loop to spring outwardly from the box, into a position in which it is accessible to an operator when the removable cover is opened. Another object of my invention is to provide a film holder of a shape differing from that of the film loop which it is adapted to contain, so that the film may normally contact with only three walls of the holder and be spaced from the fourth wall thereof. Other objects will appear from the following specification, the novel features being particularly pointed out in the claim at the end thereof.

Coming now to the drawings, wherein like reference characters denote like parts thereof:

Figure 1 is a perspective view of a film holder constructed in accordance with and embodying a preferred form of my invention;

Figure 2 is a section taken on line 2—2 of Figure 1;

Figure 3 is a perspective view of a film holder with a part of the box in an unfolded position;

Figure 4 is a perspective view of an endless loop of film for which my holder is particularly designed;

Figure 5 is a top plan view of the film shown in Figure 4, coiled up into a normal shaped coil preparatory to entering it into a film holder;

Figure 6 shows the coil of film as indicated in Figure 5, but distorted to enter into the film holder box;

Figure 7 is a plan view of a blank which may be folded up into the film-holding structure and data-bearing card shown in Figure 1, and Figure 8 shows a series of film holding devices, with their respective data cards, in a card file.

In some of the well known types of time analysis systems, motion pictures are taken of an operator performing a specific operation, and these motion pictures are studied in order to eliminate unnecessary movements and in order to establish a basis for the operator's pay. A method of utilizing such pictures is shown in U. S. Patent No. 1,857,587, Darling, May 10, 1932.

Since it is necessary to refer to these motion picture films a number of times, I have designed a holder with a card for receiving the necessary data attached, which is particularly useful in protecting loops of such film and in holding such loops for filing.

As indicated in Figure 1, a preferred form of my invention may consist of a card 1 which has a boxlike structure, designated broadly as 2, integral with or attached to one end. This boxlike structure preferably has a removable cover 3 through which a film 4 may be entered into the box. The card 1 may be printed with a series of legends 5, such that the necessary data to go with the film may be entered up into the various blanks 6.

The boxlike structure 2 may consist of a series of walls and flaps which are best shown in Figure 7, where the blank form, which is for the structure shown in Figure 1, is shown unfolded. Here the data card is integral with the boxlike structure, which may consist of a rear-wall 7 and a front-wall 8, connected by side walls 9, these walls having weakened lines 10 extending between them defining the bends which are necessary to fold up the box.

A flap 11 is provided which I prefer to fold back along the line 10 and fasten to the card 1 by means of paste or other suitable adhesive, as indicated in Figure 2.

However, if desired, the flap may be folded as indicated in 11a in Figure 3, in which it is pasted against the face of the card 1.

Referring again to Figure 7, the removable top may consist of a flap 12 with a second flap 13, 12 constituting the top of the box and 13 constituting a flap for inserting into the box when the top member is closed. These two flaps are defined by the weakened lines 14. The structure of the bottom of the box is the same as at the top, that is, there are two flaps 15 and 16 defined by the weakened lines 17, which can be folded into a bottom wall. If necessary or desirable, the flap 16 may be pasted into place so that it can not be opened. Side flaps 18 and 19 are provided on the end walls 9 at each end. These flaps are inserted in the upper and lower corners of the boxlike container.

With the blank shown in Figure 7, the film container can be readily folded up by bending the different walls along the weakened lines and by pasting flap 11 against the face of card 1.

When the box has been folded up, it forms a film container which is somewhat greater in width than the normal width of a film coil—see Figure 2—which it is adapted to contain. It is also of greater height than the normal height of the film coil. When the film coil, which is made from an endless loop of film, as shown in Figure 4, is to be entered into the film holder, the operator grasps the two sides of the coil 20, Figure 5, and presses them as indicated by the arrows A, thus elongating the coil 20. This coil can then be entered in the open top 12 of the film container, as indicated in Figure 6, and the natural resiliency of the film will cause it to contact with the side walls 9 of the container. The film is preferably thrust downwardly into the holder until the bottom of the film contacts with the bottom wall 15 of the box, thus leaving the top 21 of the film coil spaced some distance from the top of the box. There is thus room left for the end loop 22 of the film coil; this loop normally projecting a short distance through the open top of the box, as indicated in Figure 6.

This has several advantages. It provides a handle by which the film can be readily drawn from the container when the top 12 is open and this loop is so flexible that it may be readily forced down into the box shown at 22a when the box cover is closed. The natural resiliency of the film tends to locate the film in the box as shown in Figure 6 and thus there is no tendency to crush or break the loop of film 22. In a cylindrical container, the film coil 20 usually approaches the periphery of the container, causing the loop 22 to flatten out and, when the film becomes dry, it is liable to crack and break.

This container is intended primarily, as above mentioned, for an endless loop of film, namely, a loop of film as shown in Figure 4, having the film ends 24 and 25 spliced together to form a continuous film loop, since this type of continuous film loop is ordinarily used for motion picture study, it being generally desirable to repeat the picture of a single operation a series of times. The difficulty of crushing a loop of film comes up only when an endless film band is used.

In order to stagger the film container and data cards, I prefer to make rights and lefts, otherwise similar to the film holder shown in Figure 1. When a series of films have been prepared, they can be placed in the card file shown at 30 in Figure 8 with the rights and lefts positioned alternatively, so that the films are filed with their data cards in position to be at least partially visible when they are in the file. Thus, if the most important data on the card should be the Part No., this could be placed toward the top of the card and, as indicated on Figure 8, the Part Nos. for the various cards can be seen at a glance.

It should be noted that the film holder consists of a substantially flat card 1 and the boxlike film container 2 is folded up so as to lie entirely on one side of the card. This is desirable because the cards can be filed before use in substantially the flat condition shown in Figure 3, with only the flap 11, or 11a pasted down against the card. When the card is to be used, the box can be readily completed by merely folding the upper and lower flaps into the box between the side walls 9, which are first bent into an erect position.

The size and shape of the film holder box is important. From Figure 2 it will be noted that the side walls 9 of the box are of somewhat greater height than the width $w$ of the film coil 20. Thus there is but little chance of marring or abrading the film from a force applied to the front wall 8 or the rear-wall 7 of the box because the side-walls 9 are held in position by means of the top and bottom walls.

The dimensions of the height and width of the box are not critical except that as above explained it is desirable to have the width less than the normal width of a film coil 20 and the height greater than the normal height of the coil, in order to leave an open space at the top of the box into which the end coil 22 can be forced without bending or crushing.

It is customary in time study work to make the film loops of substantially the same length, although this is by no means necessary to utilize my invention.

With a film holder constituted in accordance with my invention, the film can be very quickly handled since, when the top 12 is opened, the film loop 22 springs up into a position in which it can be used as a handle to draw out the film loop 20. After projecting the film, it can be readily wound into a coil of the shape shown in Figure 5, which may be again inserted into the film holder box 2 by compressing the sides of the coil.

What I claim is:

In a holder for coils of photographic film having a loop on an outer convolution, the combination with a relatively stiff card, of a box carried on one end of said card, a plurality of walls constituting the box, said box being of considerably greater height than width, and having a cover at the top, the width of the box being less than the normal width of the film coil whereby the coil may be held in the box by the natural resiliency of the film pressing on walls of the box, the film loop on the outer film convolution being adapted to be contained between the cover and the coil of film whereby it may, through the natural resiliency of the film, spring from said box when said cover is opened.

RONALD S. SCOTT.